US011934726B1

(12) United States Patent
Allott Moore et al.

(10) Patent No.: US 11,934,726 B1
(45) Date of Patent: Mar. 19, 2024

(54) PRINT JOB REDIRECTOR TO ELECTRONIC TRANSMISSION

(71) Applicant: Xerox Corporation, Norwalk, CT (US)

(72) Inventors: John Allott Moore, Victor, NY (US); Shivan Chopra, Amherst, NY (US); Daniel Schwab, West Chester, OH (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/172,265

(22) Filed: Feb. 21, 2023

(51) Int. Cl.
*G06F 3/12* (2006.01)

(52) U.S. Cl.
CPC .............. *G06F 3/126* (2013.01); *G06F 3/121* (2013.01); *G06F 3/1259* (2013.01)

(58) Field of Classification Search
CPC ........ G06F 40/174; G06F 16/93; G06F 3/126; G06F 3/121; G06F 3/1259; G06V 30/412; G06V 30/414; H04N 1/00424; H04N 1/00427; H04N 1/00766; H04N 1/00002; H04N 1/04; H04N 1/2166; G06Q 10/087
USPC ........................................................ 358/1.5
See application file for complete search history.

(56) References Cited

U.S. PATENT DOCUMENTS

| 10,855,868 | B1 * | 12/2020 | Wushour | H04N 1/32149 |
|---|---|---|---|---|
| 2002/0196479 | A1 * | 12/2002 | Simske | H04N 1/00795 |
| | | | | 358/527 |
| 2004/0161257 | A1 * | 8/2004 | Ishihara | G06K 15/00 |
| | | | | 399/81 |
| 2007/0035780 | A1 * | 2/2007 | Kanno | H04N 1/32112 |
| | | | | 358/403 |
| 2014/0211234 | A1 * | 7/2014 | Malik | G06F 3/1271 |
| | | | | 358/1.14 |
| 2016/0231969 | A1 * | 8/2016 | Kashiwagi | G06F 3/126 |
| 2017/0236034 | A1 * | 8/2017 | Dolev | G06V 20/63 |
| | | | | 705/44 |
| 2019/0253575 | A1 * | 8/2019 | Wei | H04N 1/00724 |
| 2020/0294342 | A1 * | 9/2020 | Ronayne, Jr. | G07D 7/206 |
| 2020/0356320 | A1 * | 11/2020 | Bindana | G06F 3/126 |
| 2022/0327850 | A1 * | 10/2022 | Miyauchi | H04N 1/00427 |
| 2022/0350956 | A1 * | 11/2022 | Kawashima | G06V 30/1444 |

\* cited by examiner

*Primary Examiner* — Negussie Worku

(57) ABSTRACT

A method for redirecting a print job request for electronic transmission is disclosed. For example, a method is executed by a processor and includes receiving a print job request for a document, analyzing the document to identify a document type, determining that the document type is a candidate for electronic transmission, causing a notification to be displayed to transmit the document electronically without executing the print job request, receiving a confirmation to transmit the document electronically, and transmitting the document electronically to a network storage device.

20 Claims, 8 Drawing Sheets

PRINT JOB REDIRECTOR TO ELECTRONIC TRANSMISSION

The present disclosure relates generally to multi-function devices (MFDs) and relates more particularly to a sub-system for redirecting print job requests to an electronic submission.

BACKGROUND

Multi-function devices (MFDs) are electronic devices that can perform a variety of different functions. For example, MFDs can print, scan, copy, fax, email scanned documents, transmit scanned documents to a network storage account, and the like. Some users or businesses may have forms that they may print out to complete. The forms can be completed and then scanned or faxed to a recipient.

SUMMARY

According to aspects illustrated herein, there are provided a method and a system for redirecting a print job to an electronic transmission. One disclosed feature of the embodiments is a method executed by a processor, comprising receiving a print job request for a document, analyzing the document to identify a document type, determining that the document type is a candidate for electronic transmission, causing a notification to be displayed to transmit the document electronically without executing the print job request, receiving a confirmation to transmit the document electronically, and transmitting the document electronically to a network storage device.

Another disclosed feature is an apparatus comprising a processor and a non-transitory computer readable medium storing instructions for a print job redirector sub-system, which when executed by the processor, cause the processor to receive a print job request for a document, analyze the document to identify a document type, determine that the document type is a candidate for electronic transmission, cause a notification to be displayed to transmit the document electronically without executing the print job request, receive a confirmation to transmit the document electronically, and transmit the document electronically to a network storage device.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a print-job redirection to redirect print jobs for electronic transmission. As discussed above, some users or businesses may have forms that they may print out to complete. The forms can be completed and then scanned or faxed to a recipient.

Some companies may be tasked with organizing and harvesting information contained in printed documents. In some instances, there may be hundreds of thousands of pages of documents. Manually handling these documents can be expensive in terms of labor costs. In addition, manually analyzing printed documents can result in errors in the data that is harvested or in how the documents are organized.

In addition, printed documents are susceptible to theft or destruction. For example, if the data in the printed documents is sensitive, the data could be stolen or lost due to fire or other natural disasters. As a result, some companies may want to encourage electronic transmission of documents rather than having documents printed and submitted or printed and faxed.

The present disclosure provides a method and system that can redirected print jobs for electronic transmission. For example, a print job redirector sub-system may analyze print job requests to determine if a document is eligible for electronic transmission. If the document is eligible, the print job redirector sub-system may redirect the print job for electronic transmission without executing the print job request.

In some embodiments, recognized document types may be scanned to determine if the document was completed correctly. The redirector sub-system may detect errors in the document and may have the errors corrected before electronic transmission. Thus, the number of documents that is printed may be reduced significantly, thereby saving costs associated with paper, ink consumption, subsequent labor associated with handling and organizing the printed documents, and the like.

Figure 1:
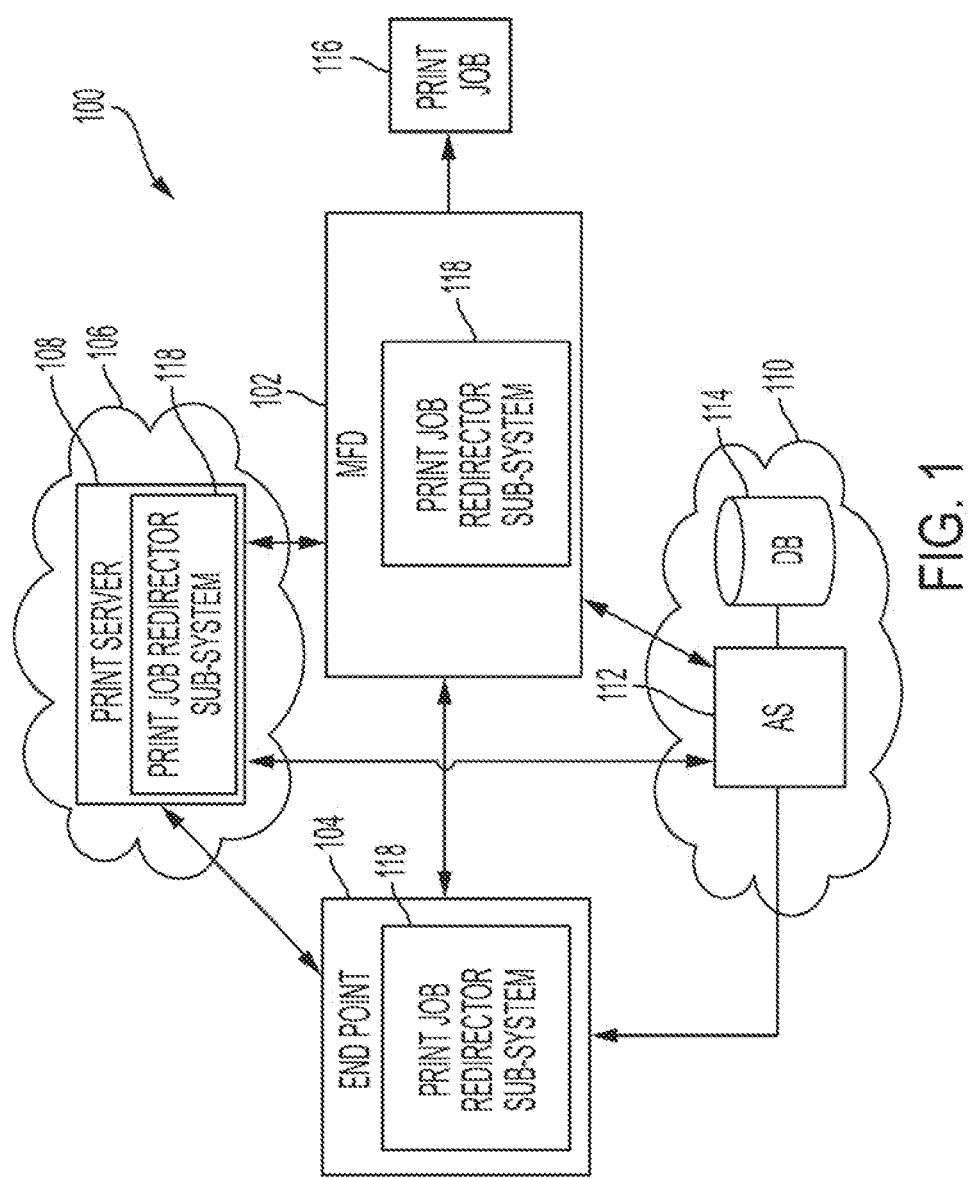
FIG. 1 illustrates an example network of the present disclosure.

FIG. 1 illustrates an example network 100 of the present disclosure. The network 100 may include an MFD 102, an endpoint device 104, a print server 108 in an internet protocol (IP) network 106, and an application server (AS) 112 and a database (DB) 114 in an IP network 110. The IP networks 106 and 110 may be any type of wired or wireless network.

It should be noted that the IP networks 106 and 110 have been simplified for ease of explanation and may include additional network elements that are not shown. For example, the IP network 106 and the IP network 110 may include additional access networks, gateways, routers, firewalls, and the like.

In one embodiment, the IP network 110 may be part of a capture and content service provider that can collect and organize electronic documents for different enterprises or entities. For example, although the AS 112 is illustrated as being communicatively coupled to a single endpoint device 104 and a single MFD 102, it should be noted that the AS 112 may be communicatively coupled to a plurality of different endpoint devices and a plurality of different MFDs for different companies.

As noted above, the IP network 110 may the AS 112 and the DB 114. The AS 112 may include a processor and memory storing instructions to execute functions described herein. The AS 112 may receive print jobs that are redirected as electronic documents and may store the electronic documents in the DB 114.

In one embodiment, the DB 114 may also store known document types that are eligible for redirection to electronic transmission. For example, the document types may include particular types of forms.

In one embodiment, the capture and content service provider may provide a print job redirector sub-system 118. The print job redirector sub-system 118 may be deployed on the MFD 102, on the endpoint device 104, or on the print server 108. FIG. 1 illustrates the print job redirector sub-system 118 as being deployed on the MFD 102, on the endpoint device 104, and on the print server 108. However, it should be noted that the print job redirector sub-system 118 is shown on the MFD 102, on the endpoint device 104, and on the print server 108 to illustrate that the print job redirector sub-system 118 is capable of being deployed on any one of the MFD 102, the endpoint device 104, and the print server 108. In practice, the print job redirector sub-system 118 may be deployed on one of the MFD 102, the endpoint device 104, or the print server 108.

Figure 2:
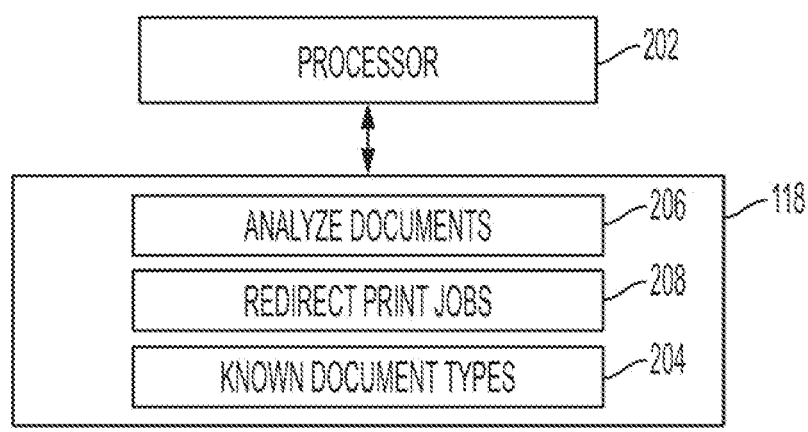
FIG. 2 illustrates a block diagram of an example print job redirector sub-system of the present disclosure.

FIG. 2 illustrates a block diagram of the print job redirector sub-system 118. In one embodiment, the print job redirector sub-system 118 may include instructions 206 to analyze documents and instructions 208 to redirect print jobs. The print job redirector sub-system 118 may also include known document types 204. The print job redirector sub-system 118 may be stored in the memory of the MFD 102, in the memory of the endpoint device 104, or in the memory of the print server 108, as discussed below.

The instructions 206 to analyze documents and the instructions 208 to redirect print jobs may be executed by a processor 202. The processor 202 may be the processor of the MFD 102, of the endpoint device 104, or of the print server 108, as discussed below.

In one embodiment, the known document types 204 may be updated periodically by the capture and content service provider. For example, as new known document types are identified by the capture and content service provider and stored in the DB 114, the capture and content service provider may periodically push updates to the known document types 204 to the print job redirector sub-system 118 via the IP network 110.

In one embodiment, the instructions 206 to analyze documents may analyze the document associated with a print job request to identify a document type. For example, an image of the document may be created as part of the print process. Before the document is printed, the document may be analyzed to determine what type of document is being printed.

Any known document analysis methods may be used. For example, an optical character reader (OCR) may be used to scan the document to detect a form number or code in the margins of the document. In another example, the OCR may scan the document to read the data contained in the document. The type of document may be identified based on the data contained in the document. In another example, the document may be analyzed to detect a particular format or ordering of the fields in the document. Known documents may have a particular format or certain types of data fields.

Figure 8:
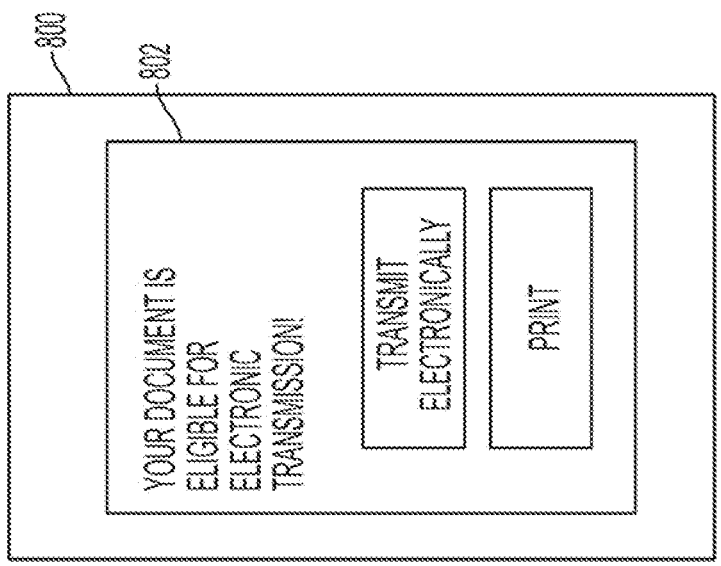
FIG. 8 illustrates an example notification in a graphical user interface (GUI) of the present disclosure.

After the document type is identified, the instructions 206 to analyze documents may determine if the document type matches one of the known document types 204. If a match is found, the document may be eligible to be redirected for electronic transmission. The user may be notified via a graphical user interface (GUI) to indicate that the print job is eligible for electronic transmission rather than printing, and confirmation may be requested from the user to confirm that the user wants to proceed with electronic transmission. An example of a GUI 800 with a notification 802 is illustrated in FIG. 8.

If confirmation is received from the user, the instructions 208 to redirect print jobs may prepare the document for electronic transmission. In one embodiment, the instructions 208 to redirect print jobs may transmit the document to the capture and content service provider via the IP network 110.

In one embodiment, the document may be a form that the user is attempting to print out and submit. If the user elects to redirect the print job request to an electronic transmission, the instructions 208 to redirect print jobs may prompt the user to complete the form before electronic transmission. For example, the user may enter data for all the fields in the form. The data may be added to the document, and the completed document may be transmitted electronically.

In one embodiment, the document may be a form that the user has already completed. For example, the user may want to print the form out and then fax the form to a recipient. However, if the user elects to redirect the print job request to an electronic transmission, the instructions 208 to redirect the print jobs may scan the document for error correction. In other words, the document may be scanned to ensure a proper format for data entered in particular fields.

Figure 9:
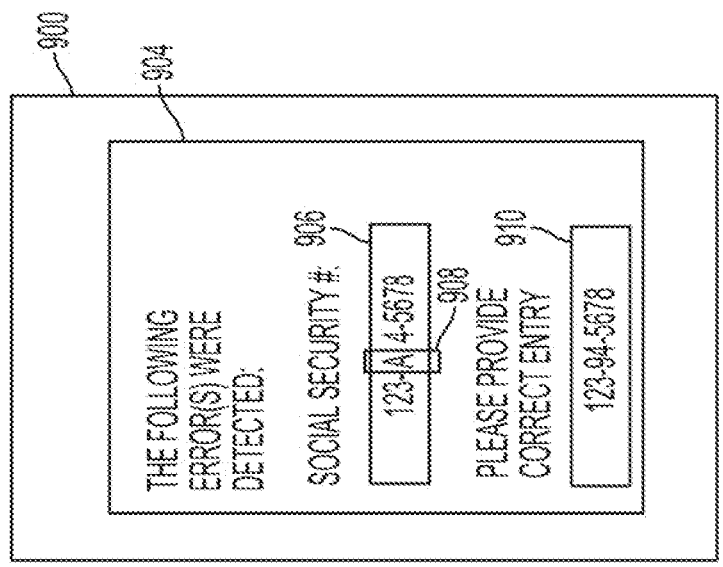
FIG. 9 illustrates an example screen shot of an error correction via the GUI of the present disclosure.

For example, a social security number field may require nine numerical digits and no letters. If a numerical digit is missing or a letter is detected, the instructions 208 to redirect print jobs may provide a notification of the detected error or errors and may allow the user to correct the error before electronic transmission. FIG. 9 illustrates an example GUI 900 that shows a notification 904 indicating an error is detected. For example, the error may be highlighted by a box 908 in a field 906. The notification 904 may include an additional field 910 to receive the correct data entry.

In one embodiment, the document may be completed by hand (e.g., written by pen or pencil), and the document may be scanned at the MFD 102 to be printed. If the document is scanned and then submitted as a print job request, the instructions 208 to redirect print jobs may use an OCR of the MFD 102 to identify the data entered in the fields and to ensure the proper format for the data entered in particular fields of the document.

If an error is detected, the instructions 208 to redirect print jobs may generate a notification for the user and may provide an opportunity for the user to correct the error. The error may enter the correct data via a GUI of the MFD 102. The instructions 208 to redirect print jobs may then generate an electronic version of the document with the hand written data converted by the OCR, including the corrected data provided by the user, and may transmit the document electronically. Notably, no updated document is printed, and the updated document is generated based on an initial print job request of a hand written document that was scanned at the MFD 102.

Thus, the print job redirector sub-system 118 may be used to redirect print job requests to electronic transmission. The print job redirector sub-system 118 may identify eligible documents based on a detected type of document in the print job request. If the user wants to transmit the document electronically instead of printing the document, the print job redirector sub-system 118 may then electronically transmit the document to the capture and content service provider via the IP network 110.

Figure 3:
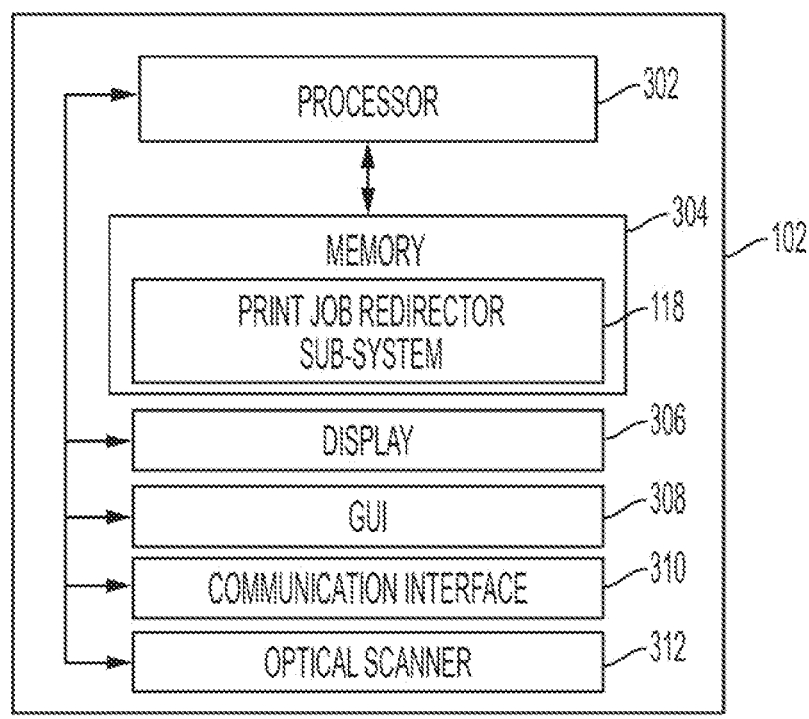
FIG. 3 illustrates a block diagram of an multi-function device (MFD) with the example print job redirector sub-system of the present disclosure.

As noted above, in one embodiment, the print job redirector sub-system 118 may be deployed in the MFD 102. FIG. 3 illustrates a block diagram of an example MFD 102 with the print job redirector sub-system 118. In one embodiment, the MFD 102 may be any type of device capable of executing a print job. In one embodiment, the MFD 102 may be capable of executing multiple different types of job functions including scanning, copying, faxing, scan to email, and the like.

In one embodiment, the MFD 102 may include a processor 302, a memory 304, a display 306, a GUI 308, a communication interface 310, and an optical scanner 312. The processor 302 may be communicatively coupled to the memory 304, the display 306, the GUI 308, the communication interface 310, and the optical scanner 312.

The memory 304 may be any type of non-transitory computer readable medium. For example, the memory 304 may be a hard disk drive, a solid state drive, a non-volatile memory express (NVMe) memory, a random access memory (RAM), a read-only memory (ROM), and the like.

The processor 302 may execute instructions stored in the memory 304. For example, the memory 304 may store the print job redirector sub-system 118. The processor 302 may execute the instructions associated with the print job redirector sub-system 118 (e.g., the instructions 206 to analyze documents and the instructions 208 to redirect print jobs).

The display 306 may be a local display of the MFD 102. The display 306 may be a touch screen display or a non-touch screen display. The display 306 may present the notifications and prompts to the user via the GUI 308, described above. For example, the GUI 308 may provide the notification (e.g., the notification 802 to the user that the document associated with the print job request is eligible for electronic transmission) and may ask whether the user wishes to electronically transmit the document rather than print the document.

The communication interface 310 may be a wired or wireless communication interface. For example, the communication interface 310 may be a wireless radio (e.g., a WiFi radio) or an Ethernet connection. The communication interface 310 may establish a communication session with the end point device 104, with the print server 108 via the IP network 106, and/or with the AS 112 of the capture and content service provider via the IP network 110.

The optical scanner 312 may include a platen glass and a scanner to capture image data from a document placed on the platen glass. The optical scanner 312 may be used to scan documents that are completed by hand so that the documents can be printed. However, as discussed above, when the scanned documents are submitted for print job requests, the print job redirector sub-system 118 may redirect the print job requests for electronic transmission.

It should be noted that the MFD 102 has been simplified for explanation and may include additional components that are not shown. For example, the MFD 102 may include paper trays, printheads, toner cartridges, a digital front end (DFE), one or more finishing modules, and the like.

Figure 4:
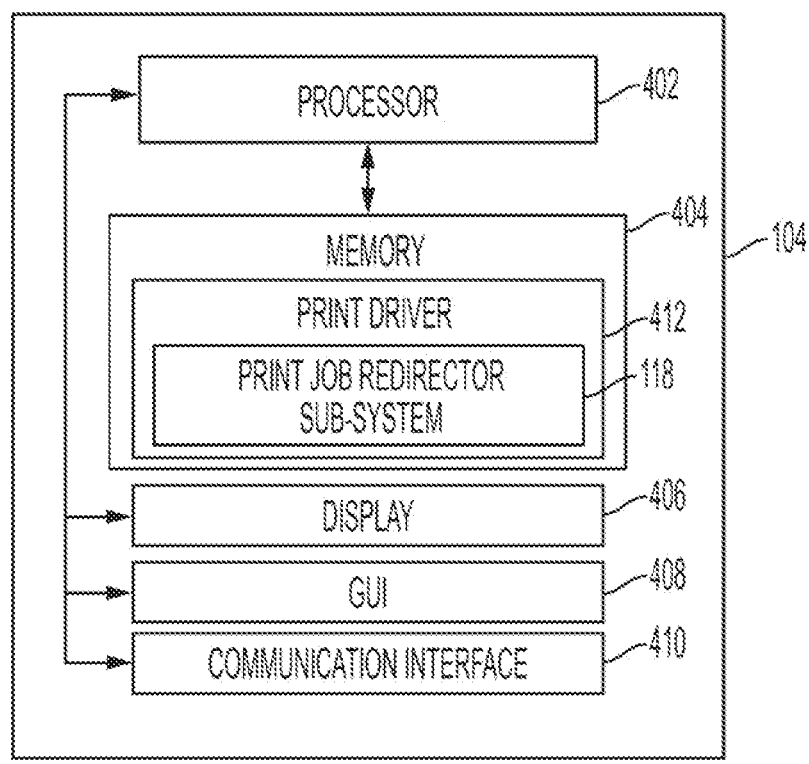
FIG. 4 illustrates a block diagram of an endpoint device with the example print job redirector sub-system of the present disclosure.

As noted above, in one embodiment, the print job redirector sub-system 118 may be deployed in the endpoint device 104. FIG. 4 illustrates a block diagram of an example endpoint device 104 with the print job redirector sub-system 118. In one embodiment, the endpoint device 104 may be any type of computing device. For example, the endpoint device 104 may be desktop computer, a lap top computer, a smart phone, a tablet computing device, and the like.

In one embodiment, the endpoint device 104 may include a processor 402, a memory 404, a display 406, a GUI 408, and a communication interface 410. The processor 402 may be communicatively coupled to the memory 404, the display 406, the GUI 408, and the communication interface 410.

The memory 404 may be any type of non-transitory computer readable medium. For example, the memory 404 may be a hard disk drive, a solid state drive, an NVMe memory, RAM, ROM, and the like.

The processor 402 may execute instructions stored in the memory 404. For example, the memory 404 may store a print driver 412. The print driver 412 may exchange messages between the endpoint device 104 and the MFD 102 such that the endpoint device 104 may transmit print job requests to the MFD 102.

In one embodiment, the print job redirector sub-system 118 may be deployed on the endpoint device 104 as part of the print driver 412. The processor 402 may execute the instructions associated with the print job redirector sub-system 118 (e.g., the instructions 206 to analyze documents and the instructions 208 to redirect print jobs) when the print driver 412 is activated in response to a print command executed by the endpoint device 104.

The display 406 may be a local display of the endpoint device 104. The display 406 may be a touch screen display or a non-touch screen display. The display 406 may present the notifications and prompts to the user via the GUI 408, described above. For example, the GUI 408 may provide the notification (e.g., the notification 802 to the user that the document associated with the print job request is eligible for electronic transmission) and may ask whether the user wishes to electronically transmit the document rather than print the document.

The communication interface 410 may be a wired or wireless communication interface. For example, the communication interface 410 may be a wireless radio (e.g., a WiFi radio) or an Ethernet connection. The communication interface 410 may establish a communication session with the MFD 102, with the print server 108 via the IP network 106, and/or with the AS 112 of the capture and content service provider via the IP network 110.

It should be noted that the endpoint device 104 has been simplified for ease of explanation and may include additional components that are not shown. For example, the endpoint device 104 may include a keyboard, a mouse, a graphics processor, one or more peripheral device interfaces (e.g., a universal serial bus (USB) interface), and the like.

Figure 5:
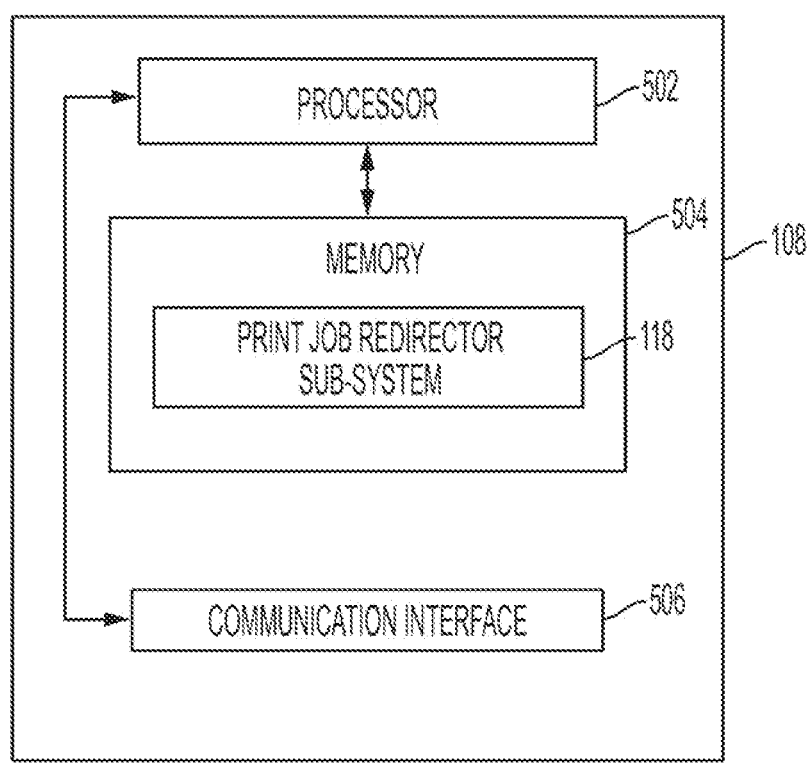
FIG. 5 illustrates a block diagram of a print server with the example print job redirector sub-system of the present disclosure.

As noted above, in one embodiment, the print job redirector sub-system 118 may be deployed in the print server 108. FIG. 5 illustrates a block diagram of an example print server 108 with the print job redirector sub-system 118. In one embodiment, the print server 108 may manage print job requests for managed network MFDs 102. For example, rather than sending print job requests directly to the MFD 102, the endpoint device 104 may transmit the print job request to the print server 108. The print server 108 may then determine to which MFD 102 to send the print job based on availability, print queues, and the like.

In one embodiment, the print server 108 may include a processor 502, a memory 504, and a communication interface 506. The processor 502 may be communicatively coupled to the memory 504 and the communication interface 506.

The memory 504 may be any type of non-transitory computer readable medium. For example, the memory 504 may be a hard disk drive, a solid state drive, an NVMe memory, RAM, ROM, and the like.

The processor 502 may execute instructions stored in the memory 504. For example, the memory 504 may store the print job redirector sub-system 118. The processor 502 may execute the instructions associated with the print job redirector sub-system 118 (e.g., the instructions 206 to analyze documents and the instructions 208 to redirect print jobs).

The communication interface 506 may be a wired or wireless communication interface. For example, the communication interface 506 may be a wireless radio (e.g., a WiFi radio) or an Ethernet connection. The communication interface 506 may establish a communication session with the MFD 102, with the endpoint device 104, and/or with the AS 112 of the capture and content service provider via the IP network 110.

It should be noted that the print server 108 has been simplified for explanation and may include additional components that are not shown. For example, the print server 108 may include a display, input devices (e.g., a keyboard, a mouse, a track pad, and the like), additional processing hardware, and the like.

Figure 6:
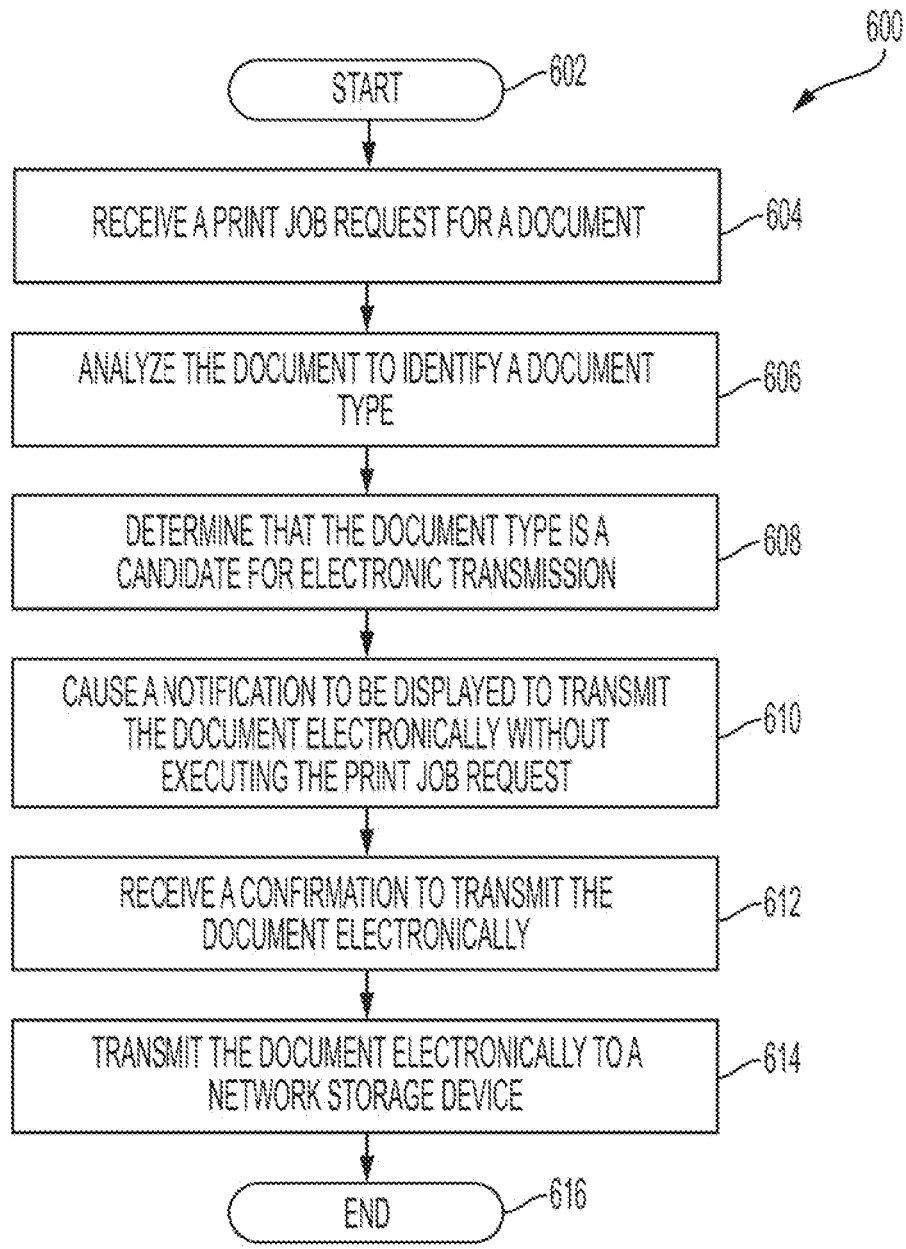
FIG. 6 illustrates a flow chart for a method of redirecting a print job to an electronic transmission of the present disclosure.

FIG. 6 illustrates a flow chart of an example method 600 for printing a document of the present disclosure. In one embodiment, the method 600 may be performed by the MFD 102, by the endpoint device 104, or by the print server 108 described above or by an apparatus such as the apparatus 700 illustrated in FIG. 7 and discussed below.

In one embodiment, the method 600 begins at block 602. At block 604, the method 600 receives a print job request for a document. For example, the print job request may be submitted by a user. The print job request may originate from an endpoint device, from a print server that manages print services for networked MFDs, or may be received directly on the MFD itself. In one embodiment, the print job request may be a request to print a document that was scanned on an optical scanner of the MFD.

At block 606, the method 600 analyzes the document to identify a document type. For example, an optical character reader may be used to scan the document for identifying information or data within the document. Identifying information may include a code or alphanumeric characters in the margins, header, or footer of the document that represent a form number or identification. For example, specific forms may be identified by a particular alphanumeric string (e.g., form-1099, form Schedule-C, and the like).

Certain forms may have certain types of information. For example, an insurance form may include personal information, a vehicle identification number, and an insurance policy number, or a job application may include personal information, work history information, and a list of references, and so forth.

In another example, the document may be analyzed by a processor to determine a particular format. For example, certain forms may organize data or fields in a particular manner or order. Some forms may have a unique font type and font size.

Although a few examples of document type identification are provided above, it should be noted that any type of method may be used to perform the document type identification.

At block 608, the method 600 determines that the document type is a candidate for electronic transmission. For example, after the document type is identified, the document type may be compared to known document types that are eligible for electronic transmission. For example, the comparison may be to see if a format of the document or identifying information matches the format or identifying information of a known document type. If a match is found, the document type may be determined to be a candidate for electronic transmission. If no match is found, the print job request may be executed as normal, and the document may be printed.

At block 610, the method 600 causes a notification to be displayed to transmit the document electronically without executing the print job request. For example, the user may be notified that the document in the print job request can be transmitted electronically without printing the document. The notification may ask the user if he or she wants to transmit the document electronically without printing the document.

At block 612, the method 600 receives a confirmation to transmit the document electronically. For example, the confirmation may be received via a selection to proceed in the notification presented by the GUI to the user. In one embodiment, the confirmation may also include an email address or other electronic recipient address for a destination to which the document should be electronically submitted. In one embodiment, the recipient may be a capture and content service provider that collects and organizes documents.

In one embodiment, if the confirmation is received, the method 600 may perform a scan to validate that the document is error free. For example, the OCR may be used to ensure that the data in each field of the document has the correct data or correct data format. For example, a certain field may require only numbers, and the OCR may detect a letter in the field. Other fields may require a certain number of characters. For example, a field for a birthdate may require a date format that only uses 8 digits (00-00-0000). However, 7 digits or 9 digits may be detected in the field. As a result, the method 600 may detect an error. The user may be presented with an opportunity to correct any detected errors by replacing the invalid entries with valid entries before the document is transmitted electronically.

In one embodiment, the method 600 may convert handwritten entries into electronic entries. For example, a user may scan a document with handwritten entries and attempt to print the scanned copy of the document. The user may be notified that the document is a known document type and that the document may be transmitted electronically without printing the document. If the user decides to transmit the document electronically, the method 600 may use the OCR to replace the handwritten entries with electronic entries.

At block 614, the method 600 transmits the document electronically to a network storage device. For example, the network storage device may be a database or a server hosted by the capture and content service provider. After the document is transmitted successfully, a notification may be generated and displayed to the user to confirm that the document was successfully transmitted. At block 616, the method 600 ends.

Figure 7:
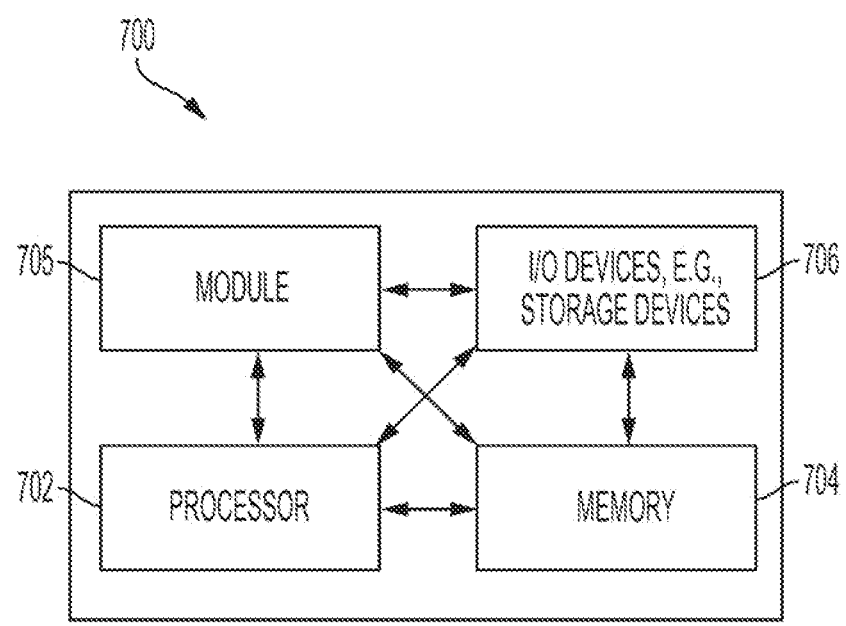
FIG. 7 illustrates a high-level block diagram of an example computer suitable for use in performing the functions described herein.

FIG. 7 depicts a high-level block diagram of a computer that is dedicated to perform the functions described herein. As depicted in FIG. 7, the computer 700 comprises one or more hardware processor elements 702 (e.g., a central processing unit (CPU), a microprocessor, or a multi-core processor), a memory 704, e.g., random access memory (RAM) and/or read only memory (ROM), a module 705 for redirecting a print job to an electronic transmission, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 705 for redirecting a print job to an electronic transmission (e.g., a software program comprising computer-executable instructions) can be loaded into memory 504 and executed by hardware processor element 702 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 705 for redirecting a print job to an electronic transmission (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
   receiving, by a processor, a print job request for a document;
   analyzing, by the processor, the document to identify a document type;
   determining, by the processor, that the document type is a candidate for electronic transmission;
   causing, by the processor, a notification to be displayed to provide an option to transmit the document electronically without executing the print job request or an option to execute the print job request;
   receiving, by the processor, a confirmation to transmit the document electronically; and
   transmitting, by the processor, the document electronically to a network storage device.

2. The method of claim 1, wherein the analyzing comprises:
   scanning, by the processor, the document to identify a format of the document; and
   comparing, by the processor, the format of the document to formats of known document types.

3. The method of claim 1, wherein the analyzing comprises:
   scanning, by the processor, the document;
   identifying, by the processor, content within the document with an optical character reader; and
   comparing, by the processor, the content within the document to content of known document types.

4. The method of claim 1, wherein the document comprises a form.

5. The method of claim 4, further comprising:
   validating, by the processor, that the form is error free.

6. The method of claim 4, further comprising:
   detecting, by the processor, an invalid entry in the form;
   prompting, by the processor, a user to submit a valid entry; and
   updating, by the processor, the invalid entry with the valid entry electronically.

7. The method of claim 1, further comprising:
   generating, by the processor, a notification confirming that the document was transmitted successfully.

8. An apparatus, comprising:
   a processor;
   a non-transitory computer readable medium storing instructions for a print job redirector sub-system, which when executed by the processor, cause the processor to:
      receive a print job request for a document;
      analyze the document to identify a document type;
      determine that the document type is a candidate for electronic transmission;
      cause a notification to be displayed to provide an option to transmit the document electronically without executing the print job request or an option to execute the print job request;
      receive a confirmation to transmit the document electronically; and
      transmit the document electronically to a network storage device.

9. The apparatus of claim 8, wherein the apparatus comprises a multi-function device (MFD), and the print job redirector sub-system is installed on the MFD.

10. The apparatus of claim 8, wherein the apparatus comprises an endpoint device, and the print job redirector sub-system is installed as part of a print driver on the endpoint device, wherein the print job redirected sub-system is executed when a print driver is activated in response to a print command.

11. The apparatus of claim 8, wherein the apparatus comprises a network print server, and the print job redirector sub-system is installed on the network print server.

12. The apparatus of claim 8, wherein the instructions to analyze comprise instructions to:
   scan the document to identify a format of the document; and
   compare the format of the document to formats of known document types.

13. The apparatus of claim 8, wherein the instructions to analyze comprise instructions to:
   scan the document;
   identify content within the document; and
   compare the content within the document to content of known document types.

14. The apparatus of claim 8, wherein the document comprises a form.

15. The apparatus of claim 14, wherein the non-transitory computer readable medium comprises further instructions to cause the processor to:
validate that the form is error free.

16. The apparatus of claim 14, wherein the non-transitory computer readable medium comprises further instructions to cause the processor to:
detect an invalid entry in the form;
prompt a user to submit a valid entry; and
update the invalid entry with the valid entry electronically.

17. The apparatus of claim 8, wherein the non-transitory computer readable medium comprises further instructions to cause the processor to:
generate a notification confirming that the document was transmitted successfully.

18. A method, comprising:
receiving, by a processor of a multi-function device (MFD), a print job request for a document;
receiving, by the processor from a print job redirector sub-system, instructions to redirect the print job request for the document to an electronic transmission, wherein the print job redirector sub-system determines the print job request is to be redirected to the electronic transmission by analyzing the document to identify a document type, determining that the document type is a candidate for electronic transmission, prompting a user to transmit the document electronically without executing the print job request via a selection made on a graphical user interface that provides an option to transmit the document electronically or an option to execute the print job request, and receiving a confirmation to transmit the document electronically; and
transmitting, by the processor, the document electronically to a network storage device.

19. The method of claim 18, wherein the document comprises a form.

20. The method of claim 19, further comprising:
validating, by the processor, that the form is error free before transmitting.

* * * * *